(12) United States Patent
Mukouyama (10) Patent No.: US 6,462,918 B2
(45) Date of Patent: Oct. 8, 2002

(54) MAGNETORESISTANCE EFFECT TYPE HEAD WITH FREE MAGNETIC LAYER OVERHANG BETWEEN MAGNETIC WALL CONTROL LAYERS

(75) Inventor: Naoki Mukouyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/962,782

(22) Filed: Sep. 25, 2001

(65) Prior Publication Data

US 2002/0012208 A1 Jan. 31, 2002

Related U.S. Application Data

(63) Continuation of application No. PCT/JP99/03412, filed on Jun. 25, 1999.

(51) Int. Cl.[7] ................................................. G11B 5/39
(52) U.S. Cl. ................................................. 360/324.12
(58) Field of Search ....................... 360/324.12, 327.31, 360/327.32

(56) References Cited

U.S. PATENT DOCUMENTS

| 4,639,806 A | * | 1/1987 | Kira et al. |
| 5,461,526 A | * | 10/1995 | Hamakawa et al. |
| 5,729,411 A | * | 3/1998 | Kishi et al. |
| 6,330,136 B1 | * | 12/2001 | Wang et al. |

FOREIGN PATENT DOCUMENTS

| JP | 4-161874 | | 6/1992 |
| JP | 5-062130 | | 3/1993 |
| JP | 6-162451 | | 6/1994 |
| JP | 7-169024 | | 7/1995 |
| JP | 8-050709 | | 2/1996 |
| JP | 8-111007 | | 4/1996 |
| JP | 8-221719 | | 8/1996 |
| JP | 8-287426 | | 11/1996 |
| JP | 2001-006127 | * | 1/2001 |

* cited by examiner

Primary Examiner—Craig A. Renner
(74) Attorney, Agent, or Firm—Greer, Burns & Crain, Ltd.

(57) ABSTRACT

The present invention is to provide a magnetoresistance effect type head which well generates the information stored in a memory device at high memory density while limiting the generation of Barkhausen noises. The magnetoresistance effect type head comprises a magnetoresistance effect element which contains a free magnetic layer having an overhang portion which is overhung and spread in left and right directions and is changed in resistance by a change in the azimuth of the magnetization of the free magnetic layer, and paired upper and lower magnetic wall control layers which are in contact with the upper and under surfaces of the left and right overhang portions of the free magnetic layer respectively and restrict the movement of the magnetic wall of the free magnetic layer.

5 Claims, 6 Drawing Sheets

MAGNETORESISTANCE EFFECT TYPE HEAD WITH FREE MAGNETIC LAYER OVERHANG BETWEEN MAGNETIC WALL CONTROL LAYERS

This is a continuation of International Application No. PCT/JP99/03412, filed Jun. 25, 1999.

TECHNICAL FIELD

The present invention relates to a magnetoresistance effect type head which detects the intensity of a magnetic field by utilizing a change in resistance corresponding to the intensity of the magnetic field and to an information reproducing device which reproduces the information stored in a storage medium.

BACKGROUND ART

Recently, along with recent spread of computers, a lot of information has been handled daily. Such information is stored in a storage medium by a large number of physical signs such as directions of magnetization or the presence/absence of pits and reproduced by an information reproducing device which reads these signs and converts these signs into electric reproducing signals corresponding to the state of these signs.

Storage mediums which store information in the form of the direction of magnetization include magnetic disks. The magnetic disk is provided with a surface which is made of a magnetic material and divided into a large number of fine one-bit areas which are respectively magnetized, and stores one-bit information in each one-bit area in accordance with the direction of magnetization. A hard disk drive which is an information reproducing device for regenerating the information stored in the magnetic disk is provided with a reproducing magnetic head for detecting an external magnetic field. This reproducing magnetic head is located so as to be close to or in contact with each of one-bit area of the magnetic disk and creates electrical reproducing signals corresponding to magnetic fields generated by the magnetization of these one-bit areas to thereby reproduce the information stored in the above magnetic disk.

The memory density of information stored in the magnetic disk is raised every year. Along with the rise in the memory density, the area occupied by the one-bit area of the magnetic disk is decreased. As the reproducing magnetic head, a highly sensitive one is required to detect the direction of the magnetization of the one-bit area decreased in the area.

As the highly sensitive reproducing magnetic head, a magnetoresistance effect type head is known which utilizes a magnetoresistance effect that the resistance changes corresponding to external magnetic fields. Among these magnetoresistance effect type heads, a spin valve head is known as a particularly highly sensitive head. This spin valve head comprises a multilayer film containing a free magnetic layer which changes in the direction of magnetization corresponding to external magnetic fields and produces a large change in resistance by the change in the direction of magnetization. This spin valve head uses the section of the above multilayer film as an information reading section, which is made to be close to or in contact with each one-bit area of the magnetic disk, to create electrical reproducing signals by utilizing a change in resistance corresponding to the magnetic fields produced by the magnetization of the one-bit area.

This free magnetic layer of the multilayer film tends to produce a magnetic wall at the end portions. If this magnetic wall is moved due to a change in external magnetic fields, the above reproducing signals generate a Barkhausen noise along with the movement of the magnetic wall. In order to suppress the generation of this Barkhausen noise, a magnetic wall control layer comprising a hard magnetic ferromagnetic material or the like is disposed as a part layer of the above multilayer film and a static magnetic field is applied to and exchange interactions are exerted on the free magnetic layer by the magnetic wall control layer to thereby fix the magnetic wall. However, it is required for the magnetic wall control layer to have a thickness equal to or larger than a predetermined thickness to suppress the generation of the Barkhausen noise sufficiently.

However, the spin valve head has the problem that if the magnetic wall control layer is thick, the thickness of the multilayer film constituting the spin valve head is increased and the width of the reading section using the section of the multilayer is widened, with the result that it is difficult to effectively detect the magnetic field generated by the magnetization of the one-bit area having a small area in the magnetic disk having high memory density.

DISCLOSURE OF THE INVENTION

In view of the above situation, it is an object of the present invention to provide a magnetoresistance effect type head and an information reproducing device which well reproduces the information stored in a storage medium with high memory density while limiting the generation of Barkhausen noises.

A magnetoresistance effect type head according to the present invention which attains above object, comprises:
  a magnetoresistance effect element which is changed in resistance corresponding to the intensity of an external magnetic field, and the step of detecting the intensity of a magnetic field by detecting the magnitude of the resistance of the magnetoresistance effect element,
  the magnetoresistance effect element comprising a multilayer film containing a free magnetic layer which is changed in the direction of magnetization corresponding to an external magnetic field, wherein the free magnetic layer is provided with an overhang portion which is overhung and spread from a layer excluding the free magnetic layer and constituting the multilayer film, and
  paired magnetic wall control layers which are in contact with the top and under surfaces of the overhang portion of the free magnetic layer respectively and restrict the movement of the magnetic wall of the overhang portion.

In the magnetoresistance effect type head of the present invention, the magnetic wall control layer preferably comprises any one of materials selected from the group comprising a hard magnetic ferromagnetic material and a hard magnetic antiferromagnetic material.

The magnetoresistance effect type head is provided with the paired magnetic wall control layers which are in contact with the top and under surfaces of the overhang portion of the free magnetic layer respectively and restrict the movement of the magnetic wall of the overhang portion. Therefore, a static magnetic field is applied to the free magnetic layer from both the top and under surfaces, and the area where the magnetic wall control layer and free magnetic layer are in contact with each other is large, and further, exchange interactions are exerted on many parts between the both layers. As a result, the movement of the magnetic wall in the free magnetic layer is limited more efficiently, giving difficulty in the generation of Barkhausen noises. Therefore, the width of a reading section which reads the information of a storage medium can be narrowed by thinning the magnetic wall control layer with keeping the function for limiting the generation of Barkhausen noises. For this reason, this magnetoresistance effect type head is suitable as a head regenerating the information of a storage medium which information is stored at high density.

In the magnetoresistance effect type head of the present invention, preferably the free magnetic layer is arranged as the lowermost layer among the multilayer film constituting the magnetoresistance effect element and comprises:

an intermediate layer having the same altitude as the magnetic wall control layer, which is formed on the lower layer side of the overhang portion among the paired magnet wall control layers, on the side of a lower layer of a portion other than the overhang portion, and an electrode on the upper layer of the magnetic wall control layer formed on the upper layer side of the overhang portion for flowing current through the magnetoresistance effect element.

Generally, a dielectric layer is formed on the above electrode and magnetoresistance effect element of the magnetoresistance effect type head and a conductive magnetic shield layer is formed on the dielectric film.

Since this magnetoresistance effect type head is provided with the intermediate layer, a difference in level between the electrode and the magnetoresistance effect element is small. When the difference in level is large, the electrode becomes close to the magnetic shield layer at the step. On the contrary, since the difference in level is small in this manner, the electrode and the magnetic shield layer in this magnetoresistance effect type head is far apart at an interval equal to or larger than a predetermined distance and insulation between the electrode and the magnetic shield layer is therefore secured.

Moreover, in the magnetoresistance effect type head of the present invention, the intermediate layer preferably comprises one or more materials selected from the group comprising Ta, Cr, TiW, $Al_2O_3$ and AlN.

Among these materials, since Ta imparts high crystallinity to the free magnetic layer, it is preferable as the material for the intermediate layer, since Cr and TiW impart high crystallinity to the magnetic wall control layer which is disposed adjacent to the intermediate layer and is occasionally overlapped on both end portions of the intermediate layer, they are preferable as the material for the intermediate layer and $Al_2O_3$ and AlN have insulation high enough to prevent the leakage of current from the free magnetic layer and are hence preferable as the material for the intermediate layer.

An information reproducing device according to the present invention which attains above object, comprises:

a magnetic head which is disposed close to or in contact with a magnetic storage medium in which information is stored by magnetization and detects the magnetization of each point of the magnetic storage medium, and the step of reproducing information corresponding to the magnetization of each point of the magnetic storage medium which magnetization is detected by the magnetic head, the magnetic head comprising a magnetoresistance effect element which is changed in resistance corresponding to the intensity of an external magnetic field, and detecting magnetic field signals by a change in the resistance of the magnetoresistance effect element, the magnetoresistance effect element comprising a multilayer film containing a free magnetic layer which is changed in the direction of magnetization corresponding to an external magnetic field, wherein the free magnetic layer is provided with an overhang portion which is overhung and spread from a layer, other than the free magnetic layer, constituting the multilayer film; and paired magnetic wall control layers which are in contact with the top and under surfaces of the overhang portion of the free magnetic layer respectively and restrict the movement of the magnetic wall of the overhang portion.

This information reproducing device comprises a magnetic head comprising the paired magnetic wall control layers which are in contact with the top and under surfaces of the overhang portion of the free magnetic layer respectively and restrict the movement of the magnetic wall of the overhang portion similarly to the above magnetoresistance effect head. Therefore, the information reproducing device is suitable as a device for reproducing the information of the storage medium which information is stored at high density.

As explained above, the present invention can provide a magnetoresistance effect type head and an information reproducing device which well reproduces the information stored in a storage medium at high memory density while limiting the generation of Barkhausen noises.

BEST MODE FOR CARRYING OUT THE INVENTION

Hereinafter, embodiments according to the present invention will be explained.

Figure 1:
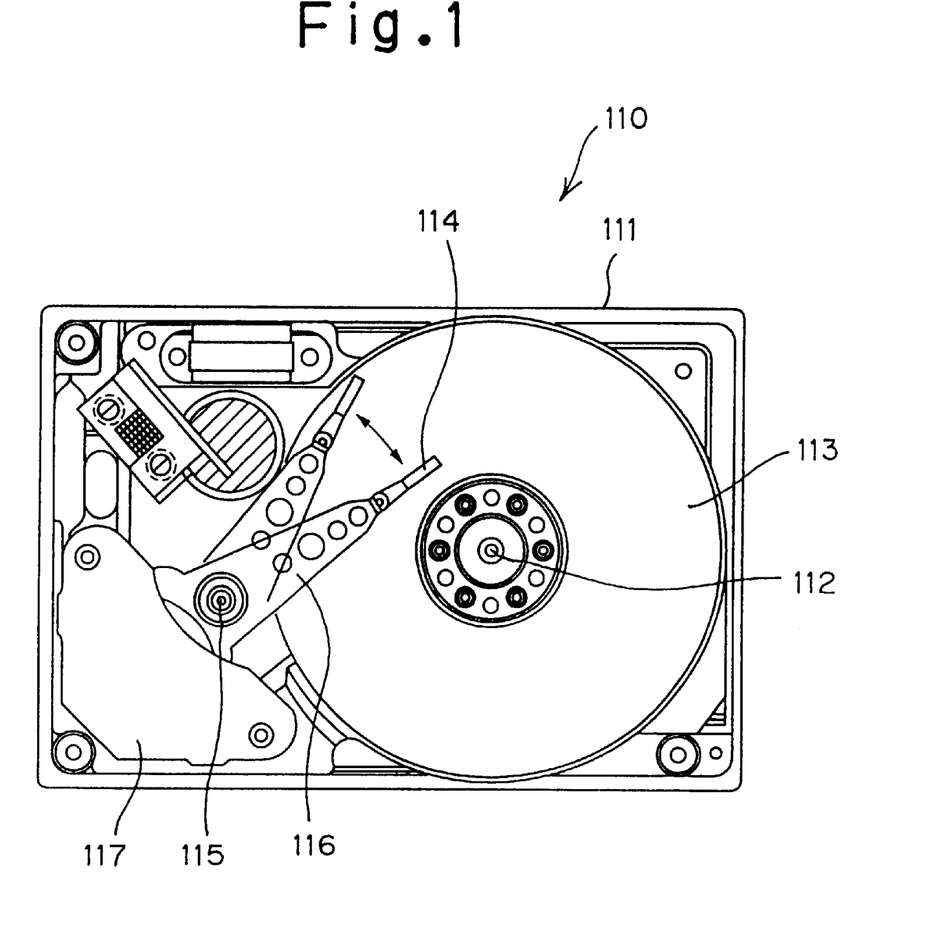
FIG. 1 is a view showing the internal structure of a hard disk drive in an embodiment according to the present invention.

FIG. 1 is a view showing the internal structure of a hard disk drive in an embodiment according to the present invention.

This hard disk drive (HDD) 110 corresponds to the information reproducing device according to the present invention. In a housing 111 of the HDD 110, a rotation axis 112, a magnetic disk 113 fitted to the rotation axis 112, a floating head slider 114 disposed facing the magnetic disk 113, an oscillating axis 115, a carriage arm 116, to the end of which the floating head slider 114 is secured and which oscillates on the center of the oscillating axis 115 and an actuator 117 which oscillates and drives the carriage arm 116 are stored. When the information stored in the magnetic disk 113 is reproduced, the carriage arm 116 is oscillated and driven by the actuator 117 constituted of a magnetic circuit whereby the floating head slider 114 is aligned to a desired track on the rotating magnetic disk 113. The floating head slider 114 is provided with a magnetic head 10 (not shown in FIG. 1) corresponding to the magnetoresistance effect type head so-meant in the present invention. The magnetic head 10 approaches each one-bit area lined in each track of the magnetic disk 113 one after another along with the rotation of the magnetic disk 113 to take out the information carried by the magnetization of each one-bit area as electric reproducing signals created corresponding to magnetic fields generated from each magnetized area. The inner space of the housing 111 is sealed by a cover (not shown).

Figure 2:
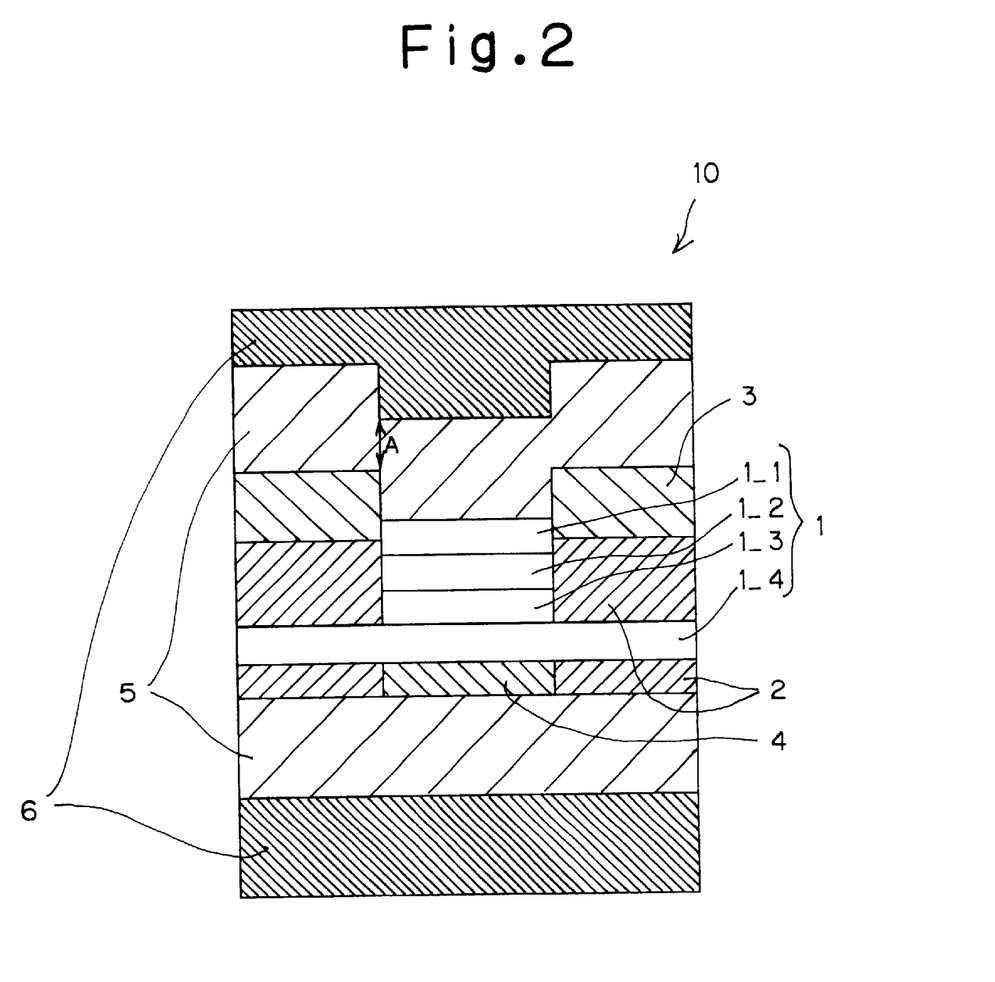
FIG. 2 is a schematic sectional view of a magnetic head in an embodiment according to the present invention.

FIG. 2 is a schematic sectional view of the magnetic head of this embodiment.

This figure is a sectional view of the magnetic head 10 as viewed from a direction perpendicular to the surface of the magnetic disk 113 shown in FIG. 1.

The magnetic head 10 is provided with a magnetoresistance effect element 1. The magnetoresistance effect element 1 comprises an antiferromagnetic layer 1_1, a fixed magnetic layer 1_2 which is joined with the underside of the antiferromagnetic layer 1_1 and magnetized in a fixed direction by switched connection, a nonmagnetic metal layer 1_3 which is joined with the underside of the fixed magnetic layer 1_2 and a free magnetic layer 1_4 which is joined with the underside of the nonmagnetic metal layer 1_3 and provided with an overhang portion which overhangs and spreads in left and right directions from the above three layers. The magnetoresistance effect element 1 has a giant magnetoresistance effect that the azimuth of the magnetization of the free magnetic layer rotates corresponding to magnetic fields applied from the outside and the resistance is largely changed according to a relative angle between the magnetization of the fixed magnetic layer 1_2 and the magnetization of the free magnetic layer 1_4.

Moreover, the magnetic head 10 is provided with paired upper and lower magnetic wall control layers 2 disposed vertically on both right and left ends thereof, the pair of magnetic wall control layers being in contact with the upper and under surfaces of the left and right overhang portions of the free magnetic layer 1_4 of the magnetoresistance effect element 1 respectively and comprising a hard magnetic ferromagnetic material. The magnetic wall control layer 2 applies a static magnetic field to and exerts exchange interactions on the free magnetic layer 1_4 to restrict the movement of the magnetic wall of the free magnetic layer 1_4. An antiferromagnetic material may be used as the material for the magnetic wall control layer 2.

The magnetic head 10 further comprises paired left and right electrodes 3 which are laminated on the top surfaces of the magnetic wall control layers 2 formed on the upper layer sides of the overhang portions respectively and are electrically joined with the magnetoresistance element 1 to thereby flow current, an intermediate layer 4 which is disposed on the underside of a part other than the overhang portion among the free magnetic layer 1_4 comprising a nonmagnetic material having the same altitude as the magnetic wall control layer 2 formed on the lower layer side of the overhang portion among the paired upper and lower magnetic wall control layers 2, paired upper and lower dielectric layers 5 comprising a nonmagnetic insulating material and are disposed so as to sandwich all of the magnetoresistance effect element 1, the magnetic wall control layer 2, the electrode 3 and the intermediate layer 4 from above and under these layers and paired upper and lower magnetic shield layers 6 comprising a conductive material and are disposed so as to sandwich the paired upper and lower dielectric layers 5 from above and under these layers.

The magnetic head 10 with its face being parallel to the section shown in FIG. 2 faces and approaches each one-bit area of the magnetic disk 113 where the magnetic fields generated by the magnetization of each one-bit area change the azimuth of the magnetization of the free magnetic layer 1_4 of the magnetoresistance effect element 1. Because current is flowing through the magnetoresistance effect element 1 via the electrode 3 and the resistance of the magnetoresistance effect element 1 is changed corresponding to a change in the azimuth of the magnetization of the free magnetic layer 1_4 as described above, electric reproducing signals carrying the information carried by the magnetization of each one-bit area are created.

Here, since the magnetoresistance effect element 1 and the electrode 3 are sandwiched between the dielectric layers 5, the current flowed from the electrode 3 flows efficiently into the magnetoresistance effect element 1. Moreover, the magnetoresistance effect element 1 is sandwiched between the pair of magnetic shield layers 6 and magnetically shielded so as not to detect unnecessary external magnetic fields. The multilayer film portion sandwiched between the pair of magnetic shield layers 6 becomes a reading section for reading the information of the magnetic disk 113. The gap width which is a width of the reading section in the direction of the thickness has a spread corresponding to the size of the one-bit area and the magnetic head 10 therefore detects magnetic fields efficiently from the one-bit area which is a reading subject of information.

Next, for comparison, explanations will be offered referring to the structure of a conventional magnetic head.

Figure 3:
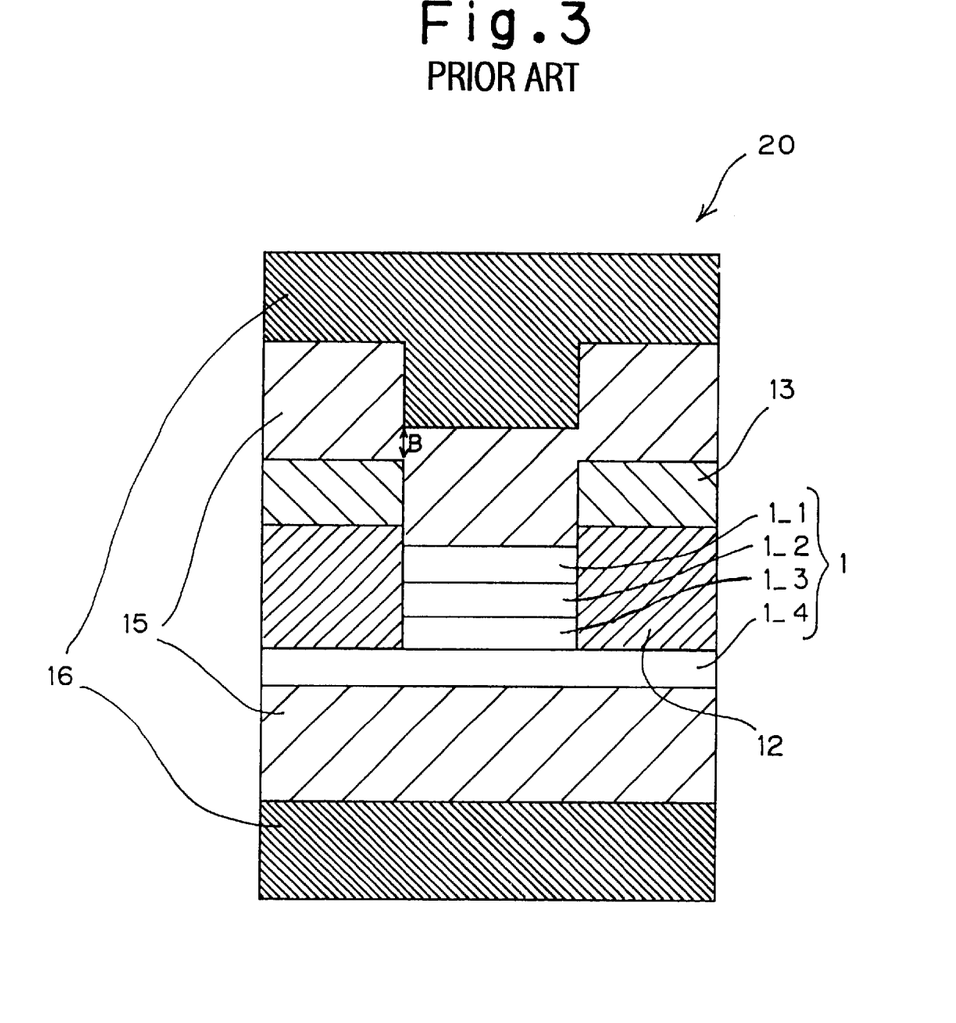
FIG. 3 is a schematic sectional view of a conventional magnetic head.

FIG. 3 is a schematic sectional view of the conventional magnetic head.

A conventional magnetic head 20 shown in this figure is provided with the same magnetoresistance effect element 1 as the magnetic head 10 of the above embodiment of the present invention. However, a magnetic wall control layer 12 of the magnetic head 20 differs from the magnetic wall control layer 2 of the magnetic head 10 in the embodiment of the present invention in that the magnetic wall control layer 12 is formed on only the top surface of the free magnetic layer 1_4. Moreover, the magnetic head 20 differs from the magnetic head 10 in that a layer corresponding to the intermediate layer 4 is not present in the magnetic head 20. The magnetic head 20 is produced by forming an electrode 13, a dielectric layer 15 and a magnetic shield layer 16, respectively, in the same manner that is used for the formation of the corresponding layers of the magnetic head 10 of this embodiment.

Compared with the conventional magnetic head 20, the magnetic head 10 of this embodiment is characterized by the point that the paired upper and lower magnetic wall control layers 2 are in contact with the overhang portion of the free magnetic layer 1_4 at the upper and under surfaces of the overhang portion. In general, the thicker the magnetic wall control layer is, the more intensive the static magnetic fields applied to the free magnetic layer becomes thereby more restricting the movement of the magnetic wall. However, in the magnetic head 10 of this embodiment, a static magnetic field is applied to the free magnetic layer 1_4 from both the top and under surfaces and because the area where the magnetic wall control layer and free magnetic layer are in contact with each other is large, exchange interactions are exerted on many parts between the both layers. As a consequence, the movement of the magnetic wall in the free magnetic layer 1_4 is limited more efficiently and therefore the generation of Barkhausen noises is restricted also when the sum of the thicknesses of the magnetic wall control layers 2 is thin.

The magnetic head 10 is a type in which the magnetic wall control layer 2 is thin-layered while maintaining the function to restrict the generation of Barkhausen noises. Therefore the magnetic head 10 has a narrow gap width and can well regenerate the information in the one-bit area of the storage medium which information is stored at high density.

Next, a process of producing the magnetic head 10 in this embodiment will be explained.

The explanations of the process is started from the situation in which first, the magnetic shield layer 6 of the lower layer side among the pair of magnetic shield layers 6 shown in FIG. 2 is formed on the substrate (not shown) by carrying out plating and on the formed magnetic shield layer 6, the dielectric layer 5 of the lower layer side among the pair of dielectric layers 5 shown in FIG. 2 is laminated using $Al_2O_3$ as a material in a thickness of 50 nm.

FIG. 4 to FIG. 14 are process diagrams showing the process of producing the magnetic head in this embodiment.

Figure 4:
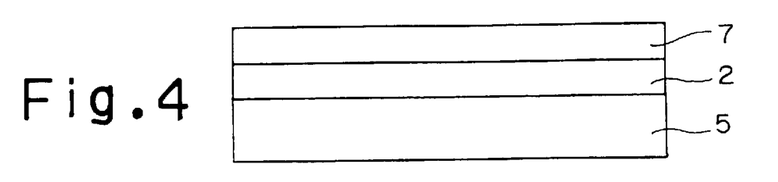
FIG. 4 to FIG. 14 are process diagrams showing a process of producing a magnetic head in an embodiment according to the present invention.
Figure 14:
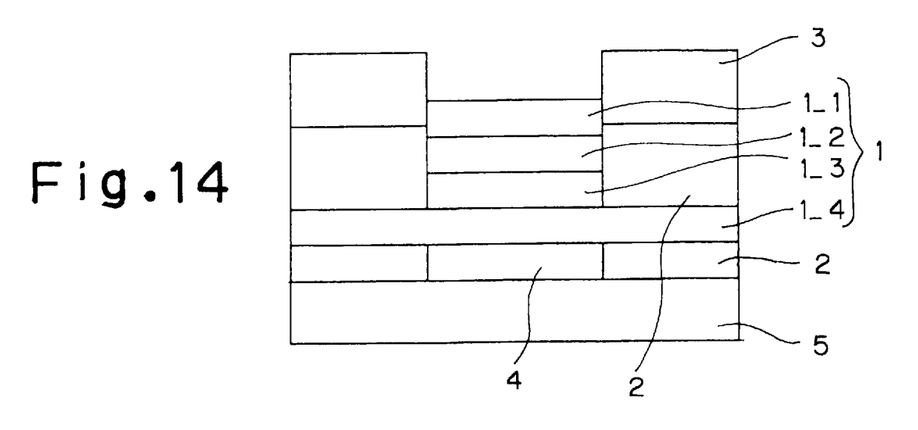

In FIG. 4 and FIG. 14, the above dielectric layer 5 of the lower layer side is shown as the lowermost layer and the above substrate and the above magnetic shield layer 6 of the lower layer side are not shown.

As shown in FIG. 4, the magnetic wall control layer 2 comprising CoPt is formed on the dielectric layer 5 of the lower layer side in a thickness of 40 nm and a photoresist layer 7 is formed on the formed magnetic wall control layer 2 in a thickness of 1 μm, followed by patterning.

Figure 5:
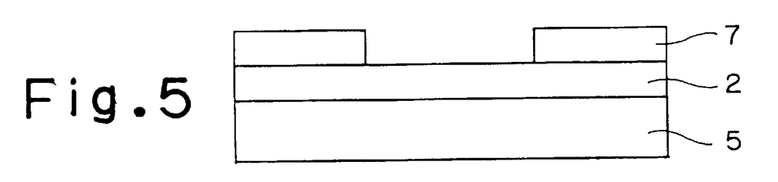

As shown in FIG. 5, the 1-μm-wide center part of the photoresist layer 7 is removed to make paired left and right photoresist layers 7 for lift-off.

Figure 6:
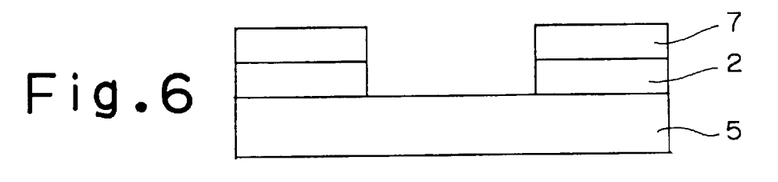

Both the paired left and right lift-off photoresist layers 7 are respectively masked using a metal mold (not shown) and the unmasked center part of the magnetic wall control layer 2 is etched by an ion milling method as shown in FIG. 6. By this etching, the magnetic wall control layer 2 of the lower layer side among the paired upper and lower magnetic wall control layers 2 shown in FIG. 2 is formed on both left and right sides.

Figure 7:
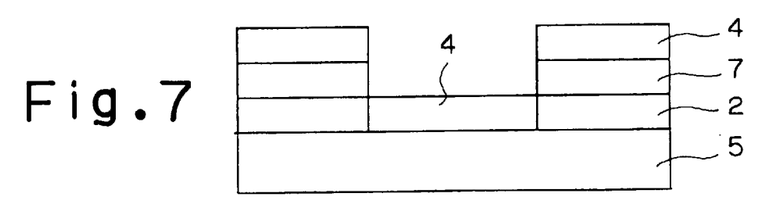

In succession, as shown in FIG. 7, $Al_2O_3$ with a thickness of 35 nm is laminated on the center of the substrate and on the left and right photoresist layers 7 and further Ta with a thickness of 5 nm is laminated to form the intermediate layer 4.

Figure 8:
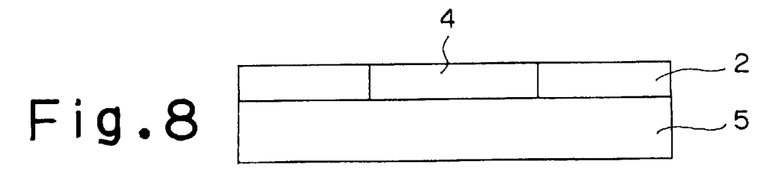

In the step shown in FIG. 8, the lift-off photoresist layer 7 is peeled off. By this peeling process, the intermediate layer 4 having a width of 1 μm and sandwiched between the left and right magnetic wall control layers 2 of the lower layer side as shown in FIG. 2 is formed.

Figure 9:
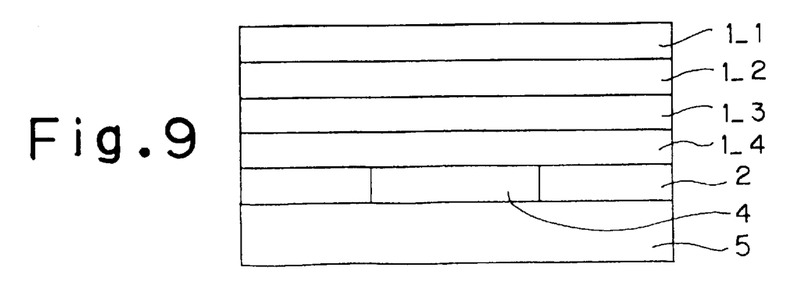

Next, as shown in FIG. 9, a 5-nm-thick layer comprising NiFe and constituting the free magnetic layer 1_4, a 2-nm-thick layer comprising CoFeB and constituting the same free magnetic layer 1_4, a 3-nm-thick nonmagnetic metal layer 1_3 comprising Cu, a 2-nm-thick fixed magnetic layer 1_2 comprising CoFeB and a 25-nm-thick antiferromagnetic layer 1_1 comprising PdPtMn are continuously formed in this order from the lower side on the top surfaces of the magnetic wall control layers 2 and on the intermediate layer 4.

Figure 10:
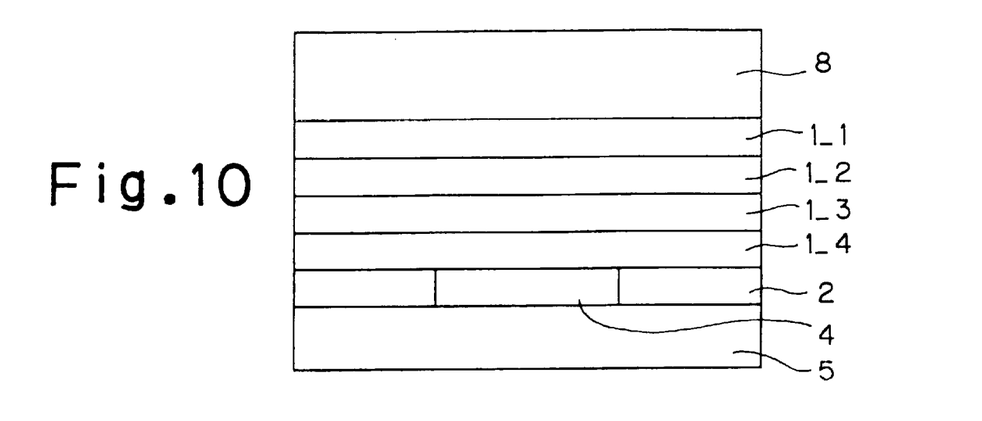

As shown in FIG. 10, a photoresist layer 8 with a thickness of 1 μm is further laminated on the antiferromagnetic layer 1_1 and the photoresist layer 8 is patterned.

Figure 11:
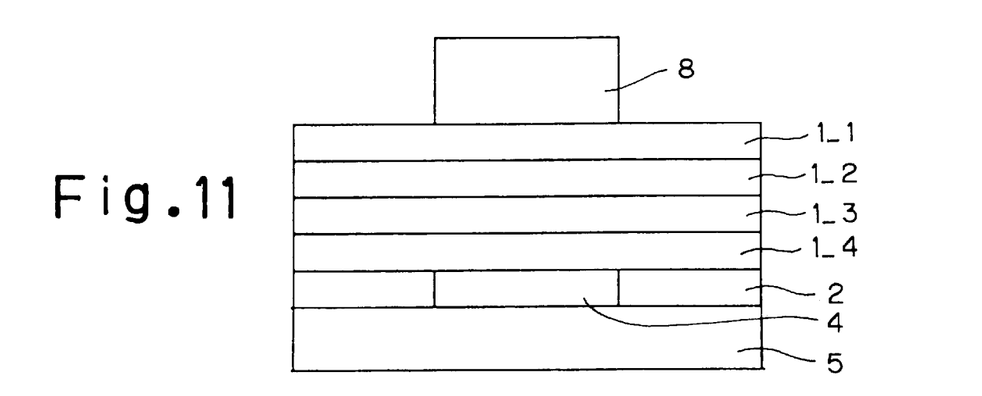

The left and right portions of the photoresist layer 8 are removed while allowing the center part with a width of 1 μm to remain to form the lift-off photoresist layer 8 as shown in FIG. 11.

Figure 12:
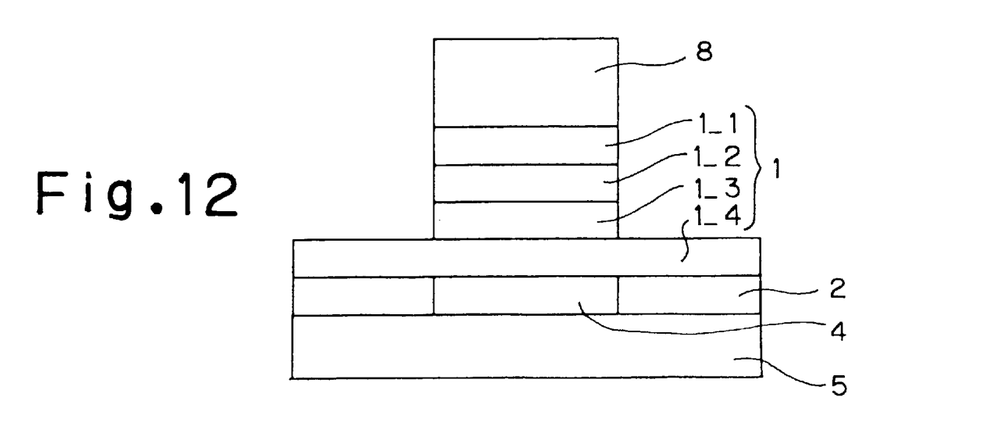

This lift-off photoresist layer 8 is masked using a metal mold (not shown) to carry out the etching of the left and right portions unmasked by the above metal mold in three layers, namely, the antiferromagnetic layer 1_1, the fixed magnetic layer 1_3 and the nonmagnetic metal layer 1_3 by using an ion milling method to the extent that, as shown in FIG. 12, the top surface of the free magnetic layer 1_4 appears, while the center part with a width of 1 μm in these three layers is left. By this etching, the magnetoresistance effect element 1 is formed as shown also in FIG. 2.

Figure 13:
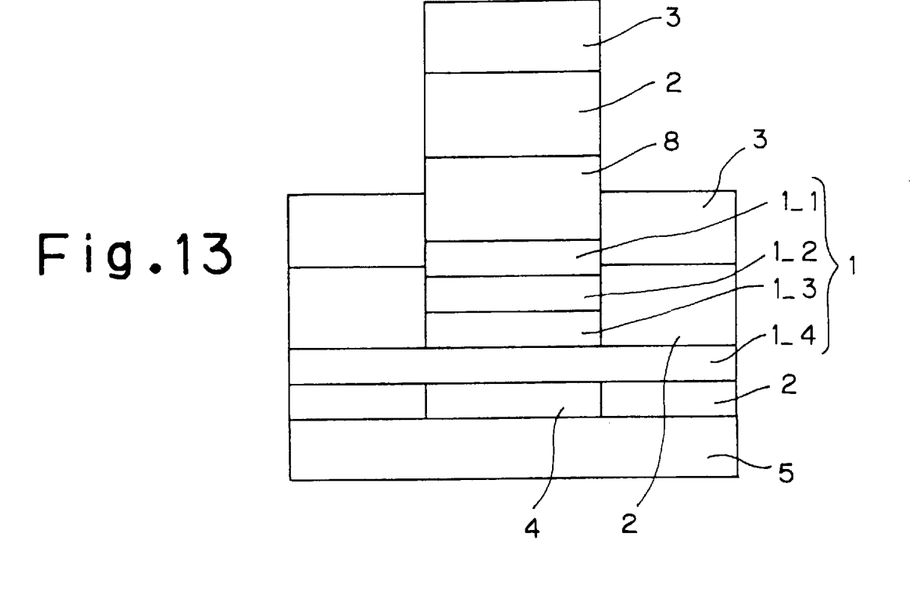

As shown in FIG. 13, the magnetic wall control layer 2 having a thickness of 40 nm and comprising CoCrPt, a 80-nm-thick layer comprising Ta and constituting the electrode layer 3 and a 20-nm-thick layer comprising W and constituting the same electrode layer 3 are laminated in this order from the lower side on the top surface corresponding to the overhang portion of the free magnetic layer 1_4 and on the photoresist layer 8 left in the center part.

As shown in FIG. 14, the lift-off photoresist layer 8 is peeled off. The magnetic wall control layer 2 and electrode 3 which are left on the left and right sides after the peeling process are those on the upper layer side of the paired upper and lower magnetic wall control layers 2 as shown in FIG. 2. The dielectric layer 5 and the magnetic shield layer 6 not shown in FIG. 14 are laminated in this order on the electrode 3 and the magnetoresistance effect element 1. Here, a difference in level between the electrode 3 and the magnetoresistance effect element 1 is not steep unlike that shown in FIG. 14 or FIG. 2 but is dull to some extent. Therefore, insulation between the magnetic shield layer 6 and the electrode 3 of the upper side is maintained. In the above manner, the magnetic head 10 of this embodiment is thus formed.

In the above process of the production of the magnetic head 10, an example in which a magnetic head provided with the upper side dielectric layer 5 having a small thickness is formed is given as a preferred embodiment. However, in the following, explanations will be furnished on the assumption that the dielectric layer 5 is thick to some extent, and as shown in FIG. 2, the altitude of the lowermost surface of the magnetic shield layer 6 is higher than that of the top surface of the electrode 3 for the sake of convenient explanations as to insulation between these two layers.

In the magnetic head 10, as shown in FIG. 2, when a difference in altitude between the top surface of the electrode 3 and the top surface of the magnetoresistance effect element 1 is large, an interval between the upper side magnetic shield layer 6 and electrode 3 is narrowed and an interval A between the altitude of the top surface of the electrode 3 and the altitude of the under surface of the upper side layer of the paired upper and lower magnetic shield layer 6 is narrowed.

The conventional magnetic head 20 is also produced in the same process that is used to produce the magnetic head 10 shown in FIG. 9 to FIG. 14 except that the free magnetic layer 1_4 is laminated on the dielectric layer 15. Since the conventional magnetic head 20 is provided with the thick magnetic wall control layer 12 as described above, a difference in altitude between the top surface of the electrode 13 and the top surface of the magnetic resistance element 1 is large as shown in FIG. 3. This large difference causes a spread of an interval B between the altitude of the top surface of the electrode 13 and the altitude of the under surface of the upper layer side of the paired upper and lower magnetic shield layers 16 without increasing the layer thickness of the dielectric layer 15, giving a difficulty in ensuring insulation between the magnetic shield layer 16 and the electrode 13.

However, in the magnetic head 10 of this embodiment, as described above, the sum of the layer thicknesses of the paired upper and lower magnetic wall control layers 2 is small, in addition, the magnetic wall control layer 2 is divided into two layers disposed respectively above and under the free magnetic layer 1_4 and the magnetoresistance effect element 1 is bottom-upped by the intermediate layer 4. Therefore, a difference in altitude between the top surface of the electrode 3 and the top surface of the magnetoresistance effect element 1 is small. Since this difference is small in the magnetic head 10 of this embodiment, the above interval A is kept equal to or larger than a predetermined distance while the above gap width is kept narrow without increasing the layer thickness of the dielectric layer 5, ensuring insulation between the magnetic shield layer 6 and the electrode 3.

When the altitude of the lowermost surface of the magnetic shield layer 6 is lower than the altitude of the top surface of the electrode 3, a difference in altitude between the top surface of the electrode 3 and the top surface of the magnetoresistance effect element 1 is also small. Therefore, an interval equal to or larger than a predetermined distance is kept between the magnetic shield layer 6 and the electrode 3 and thus insulation is ensured.

It is to be noted that although the intermediate layer 4 is used for the bottom-up of the magnetoresistance effect element 1, it can play a role as a base layer for the free magnetic layer 1_4 and as a dielectric layer. For this, the intermediate layer 4 preferably comprises one or more materials selected from the group comprising Ta imparting good crystallinity to the free magnetic layer 1_4, Cr and TiW which impart good crystallinity to the magnetic wall control layer 2 which is occasionally overlapped on both ends of the intermediate layer 4 in actual though not shown in the figures and $Al_2O_3$ and AlN which have high insulation and prevent current from leaking from the free magnetic layer 1_4.

What is claimed is:

1. A magnetoresistance effect type head having
   a magnetoresistance effect element which is changed in resistance corresponding to the intensity of an external magnetic field, and detecting the intensity of a magnetic field by detecting the magnitude of the resistance of the magnetoresistance effect element, comprising:
   the magnetoresistance effect element comprising a multilayer film including a free magnetic layer which is changed in the direction of magnetization corresponding to an external magnetic field, wherein the free magnetic layer is provided with an overhang portion which is overhung and spread from a layer excluding the free magnetic layer and constituting the multilayer film, and
   paired magnetic wall control layers which are in contact with the upper and under surfaces of the overhang portion of the free magnetic layer respectively and restrict the movement of the magnetic wall of the overhang portion.

2. A magnetoresistance effect type head according to claim 1, wherein the magnetic wall control layer comprises any one of materials selected from the group consisting of a hard magnetic ferromagnetic material and an antiferromagnetic material.

3. A magnetoresistance effect type head according to claim 1, wherein the free magnetic layer is arranged as the lowermost layer among the multilayer film constituting the magnetoresistance effect element and comprises:
   an intermediate layer having the same altitude as the magnetic wall control layer, which is formed on the lower layer side of the overhang portion among the paired magnetic wall control layers, on the side of a lower layer of a portion other than the overhang portion, and
   an electrode on the upper layer of the magnetic wall control layers formed on the upper layer side of the overhang portion for flowing current through the magnetoresistance effect element.

4. A magnetoresistance effect type head according to claim 3, wherein the intermediate layer comprises one or more materials selected from the group consisting of Ta, Cr, TiW, $Al_2O_3$ and AlN.

5. An information reproducing device comprising a magnetic head which is disposed close to or in contact with a magnetic storage medium in which information is stored by magnetization and detects the magnetization of each point of the magnetic storage medium, and reproducing information corresponding to the magnetization of each point of the magnetic storage medium which magnetization is detected by the magnetic head, wherein:
   the magnetic head comprises a magnetoresistance effect element which is changed in resistance corresponding to the intensity of an external magnetic field, and detects magnetic field signals by a change in the resistance of the magnetoresistance effect element,
   the magnetoresistance effect element comprising a multilayer film including a free magnetic layer which is changed in the direction of magnetization corresponding to an external magnetic field, wherein the free magnetic layer is provided with an overhang portion which is overhung and spread from a layer excluding the free magnetic layer and constituting the multilayer film, and
   paired magnetic wall control layers which are in contact with the upper and under surfaces of the overhang portion of the free magnetic layer respectively and restrict the movement of the magnetic wall of the overhang portion.

* * * * *